May 28, 1968   L. L. C. H. STOULS   3,385,427
CARTRIDGE FOR ANCHORING ROCKS WITH A MORTAR
INCLUDING PLASTIC MATERIAL
Filed Nov. 28, 1966

3,385,427
CARTRIDGE FOR ANCHORING ROCKS WITH A MORTAR INCLUDING PLASTIC MATERIAL
Leon Louis Charles Henri Stouls, Paris, France, assignor to Societe des Explosifs Titanite, Pontailler-sur-Saone, Cote d'Or, France
Filed Nov. 28, 1966, Ser. No. 597,426
Claims priority, application France, Dec. 2, 1965, 40,691
7 Claims. (Cl. 206—47)

ABSTRACT OF THE DISCLOSURE

A cartridge and a method for forming a cartridge in which an outer envelope is formed over an inner envelope which is filled with a mixture of plastic material, filler and accelerating agent, with a catalyst being distributed between the envelopes.

---

The present invention relates to a method of anchoring rocks which consists of sealing a metal rod or bar into a deep hole drilled in a rock wall, said sealing being effected by the use of a mortar comprising a filler material (which most often is sand) mixed with a binding agent consisting of plastic material to which a suitable catalyst is ultimately added for the polymerization of said plastic material.

It has been proposed in the past, for obtaining such a seal, to introduce into the drilled hole one or more envelope-like cartridges containing together the filler, a resin and the accelerating agent therefor, the catalyst being also located inside the cartridge within a sealed envelope of much smaller dimension than the latter. The bar to be sealed is subsequently introduced by means of a rotating or vibrating drill member intended to shred off both above-mentioned envelopes and to ensure the proper mixing of the catalyst with the mortar, to obtain the setting thereof in a relatively short time.

The cartridges utilized to this purpose most usually comprised an outer envelope made of thin glass, the catalyst being located in another envelope of smaller diameter made also of thin glass, said latter envelope being shorter than the former and being located inside said first envelope. It is also possible to utilize cartridges including a hollow tube of thin plastic material, the catalyst being contained in another tube of plastic material, said last tube being made of plastic material much thinner than the first cited one and extending over the whole length of said first tube.

Said last type of cartridge is assumed to enhance a better lengthwise distribution of the catalyst into the resin but, as a matter of fact, the complete tearing or shredding of both plastic material tubes by the bar is extremely difficult to obtain, an incomplete tearing being detrimental to the proper distribution of the catalyst as well as to the final quality or strength of the seal.

The present invention is precisely related to novel sealing cartridges of the above-mentioned type ensuring both the proper distribution of the catalyst lengthwise as well as in the whole cross-section area of said cartridge, and the easy tearing or shredding of both of said envelopes. Also, the present invention minimizes the breakability of said cartridges during their transportation, and reduces their manufacturing cost.

The present invention has also for its object, a novel cartridge adapted to seal a rod or bar in a hole drilled in rock, by means of a mortar of plastic material which is polymerized through the action of a catalyst, said cartridge being essentially characterized in that it includes two impervious envelopes located very close one from the other, said envelopes preferably being made of vegetable parchment, the mixture of resin with the fillers and the accelerating agent being located into the innermost envelope, said catalyst being uniformly distributed between said two envelopes.

The present invention has also for its object a process for producing said cartridges, said process being essentially characterized in that a paper tube is obtained from a strip of known material, said paper tube being subsequently continuously coated by dipping into the catalyst, after which a second paper tube is formed around the first coated tube and obtained also from a strip of material, said composite continuous tube being subsequently cut into sections. One end of each of the sections is closed by a double folding and the setting of a fastener, the other end thereof being closed in the same manner after the so obtained container has been filled with the mixture of resin and filler.

The invention will now be further described by way of a purely exemplary embodiment, with reference to the annexed drawing wherein.

Figure 1:
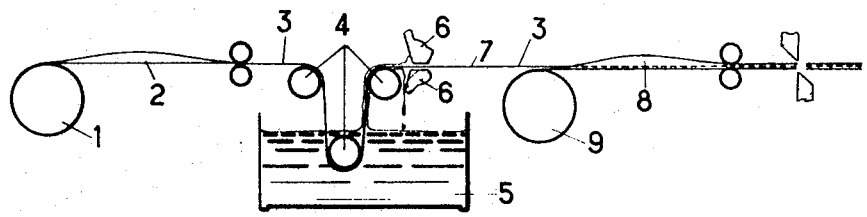
FIG. 1 is an elevation schematically showing the mode of production of the double walled tube.

The process of making the inventive cartridges includes, on the one hand, a first continuous stage of forming and cutting of the abovementioned tube, whose two walls are separated by a coating of catalyst, and, on the other hand, a second discontinuous filling and closing stage. The first stage, which is schematically illustrated in FIG. 1, is started from a feed roll 1 containing a flat strip of paper 2, said paper being of a type both impervious and easily torn or shredded vegetable parchment. For example, a sulphurized vegetable parchment may be usefully utilized to this end.

Said paper strip is continuously unrolled and fed into a known machine forming a paper tube 3 by continuously folding and glueing both edges of said strip one over the other. The tube so obtained is fed in a system of rolls 4, so as to be dipped into a bath containing the catalyst specifically corresponding to the type of resin utilized. The viscosity of said catalyst ensures a good adhesion thereof over the two faces of the flattened tube corresponding to the outer wall thereof.

A die member 6 controls the thickness of the entrained catalyst coated on the paper and returns the excess catalyst into bath 5. The tube 3 formed by strip 2, with the outer coating of catalyst 7, is then laid over the second strip 8 of paper, which is identical to strip 2, said second strip being continuously unrolled from a feed roll 9, which is identical to feed roll 1, said second paper strip being also continuously folded and glued around and over tube 3, thus forming the outermost wall of the completed tube.

Figure 2:
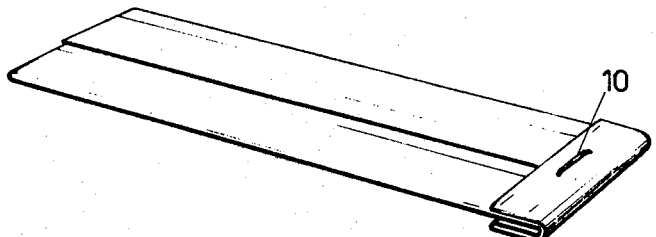
FIG. 2 is a perspective view showing the manner of closing one of said tube ends.
Figure 3:
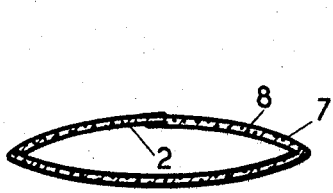
FIG. 3 is a sectional view of the tube prior to the filling thereof.
Figure 4:
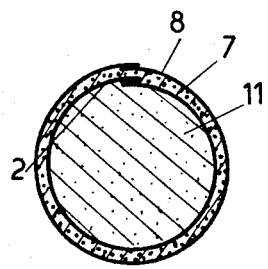
FIG. 4 is a sectional view of said tube after the filling thereof.

The completed tube, that is the tube made of two paper layers 2 and 8 separated by the catalyst 7, as shown in FIG. 3, is then cut into sections of desired length at a cutting station located at the exit end of the forming machine. Said sections are afterwards submitted to a sequence of discontinuous operations for finishing the cartridges. First, one end of each tube section is folded twice in opposite directions, as shown in FIG. 2, and a fastener 10 is passed through the four folds which in turn comprise each four layers of paper.

The free ends of the flattened tubes so obtained are then opened and filled with a mixture 11, consisting, in the conventional manner, of a filler and of a resin mixed together with a suitable accelerating agent. After completion of said filling stage, the bag is ultimately closed in the same manner as hereinabove described.

The cartridges so obtained are easy to handle and to store and the transportation thereof is also easy because of the unbreakability thereof. Besides, no leakage of the plastic material may occur, as any outward leakage of said plastic material is impossible, particularly at the location of fasteners 10, because, in case of leakage, the plastic material is compelled to get through the layer or coating 7 of catalyst, the contact of the said plastic material with the catalyst causing the setting of said plastic material and thus automatically clogging said leak.

The inventive cartridges are utilized in the conventional manner as follows; the required quantity of cartridges is first introduced into the hole drilled in the rock, said quantity being a function of the volume of the drilled hole and of the volume of the rod or bar to be introduced therein. Said rod or bar is thereafter introduced by rotating the same on its axis with, for example a drill holder tool in such a manner that the end of said rod progressively destroys or shreds off the two paper envelopes and operates the intimate mixing of catalyst 7 with mortar 11, the proportions of the catalyst in said mixture being always constant by reason of the perfect distribution of the product on the whole of the length and on the whole of the periphery of each section.

After the rod had been completely engaged or bottomed, it is left in position and, after a relatively short period of time, the mortar has set, thereby strongly sealing the rod in the drilled hole. Effectively, the mortar adheres directly on the surface of the rod and, because of the complete destruction or tearing of the two paper walls, adheres also directly to the rock wall, on the whole of the periphery of said hole. It is thus easy to understand that the inventive cartridge will obtain more quickly stronger seals than the theretofore known cartridges and that, moreover, it is more advantageous because of the relatively more economical process of production thereof.

It should be well understood that the abovedescribed embodiment is purely illustrative and in no way limitative and may receive any modification within the scope of the appended claims.

More particularly, the closure of the ends of each tube section may be effected by any other means than fastening, such as by glueing.

What is claimed is:
1. A cartridge comprising an inner envelope, a filler and a plastic material mixed together with a suitable accelerating agent and disposed in said inner envelope, an outer envelope telescoped over said inner envelope and coextensive therewith, and a catalyst uniformly distributed between said envelopes and secured to one of said envelopes, said envelopes being closed together at their respective ends.

2. A cartridge as described in claim 1, characterized in that both said envelopes are made of vegetable parchment.

3. The cartridge of claim 1, wherein said catalyst is coated on the outer surface of said inner envelope.

4. A method for manufacturing a cartridge comprising the steps of forming an inner envelope, forming an outer envelope extending over said inner envelope and coextensive therewith, securing a catalyst to one of said envelopes to uniformly distribute the catalyst between said envelopes, filling said inner envelope with a mixture of plastic material, filler, and an accelerating agent, and closing the ends of said envelopes together.

5. The method of claim 4, wherein said catalyst is coated over said inner envelope.

6. The method of claim 3, wherein both ends of each of said envelopes is closed by folding their respective end portions in one direction about a first line extending generally perpendicular to the longitudinal axis of said envelopes, and then folding said respective end portions in a direction opposite to said one direction about a second line generally parallel to said first line and located substantially midway between said first line and the respective ends of said envelopes.

7. The method of claim 3, wherein said envelopes are formed continuously and then cut into separate sections.

References Cited

UNITED STATES PATENTS

| 2,245,675 | 6/1941 | Hultin | 53—27 X |
| 2,977,729 | 4/1961 | Frechtmann et al. | 53—29 |

FOREIGN PATENTS 1,423,023　11/1965　France.

MARTHA L. RICE, *Primary Examiner.*